United States Patent [19]

Smith

[11] Patent Number: 5,287,885
[45] Date of Patent: Feb. 22, 1994

[54] HYDRAULIC CONTROL SYSTEM FOR WEIGHING AND TWO-WAY VALVE THEREFOR

[75] Inventor: Ronald Smith, Narrabeen, Australia

[73] Assignee: Wray-Tech Instruments, Inc., Stratford, Conn.

[21] Appl. No.: 994,347

[22] Filed: Dec. 21, 1992

Related U.S. Application Data

[62] Division of Ser. No. 868,305, Apr. 14, 1992, Pat. No. 5,195,418, which is a division of Ser. No. 683,078, Apr. 10, 1991, Pat. No. 5,139,101.

[51] Int. Cl.$^5$ .............................................. F15B 13/04
[52] U.S. Cl. .................................. 137/596.17; 91/31; 91/443
[58] Field of Search ................. 91/31, 443; 137/596.17

[56] References Cited

U.S. PATENT DOCUMENTS 4,590,966  5/1986  Figuerda et al. ............... 137/596.17
5,165,320  11/1992  Ravn ................................... 91/31

Primary Examiner—Gerald A. Michalsky
Attorney, Agent, or Firm—Lee, Mann, Smith, McWilliams, Sweeney & Ohlson

[57] ABSTRACT

A motion control system for hydraulically operated lifting devices. The system provides for the dynamic weighing of a loaded container by controllably directing hydraulic flow through a bypass chamber of a two-way valve. An analog output signal is generated by a hydraulic pressure transducer fluidly communicating with the two-way valve or by a tensiometer mounted on the arms of the lifting device. The two-way valve further provides a second bypass chamber which receives fluid under gravity from the lift circuit line of the hydraulic cylinder for controllably lowering the lifting device. The pressure transducer or tensiometer generate an analog signal proportionate to the weight being lowered and whereby the hydraulic fluid is returned to the reservoir of the hydraulic system independently and downstream of the main operating valve.

1 Claim, 8 Drawing Sheets

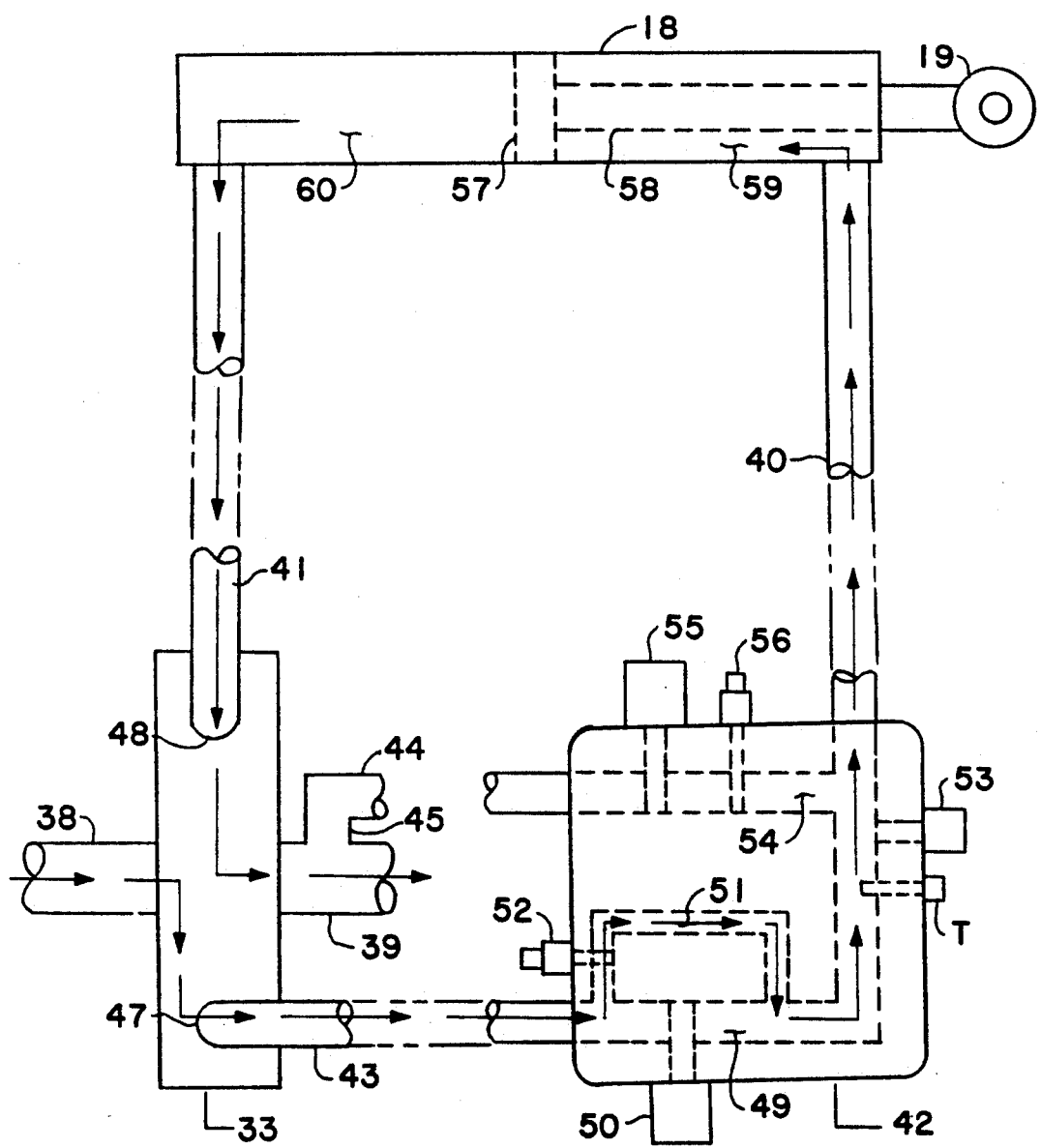

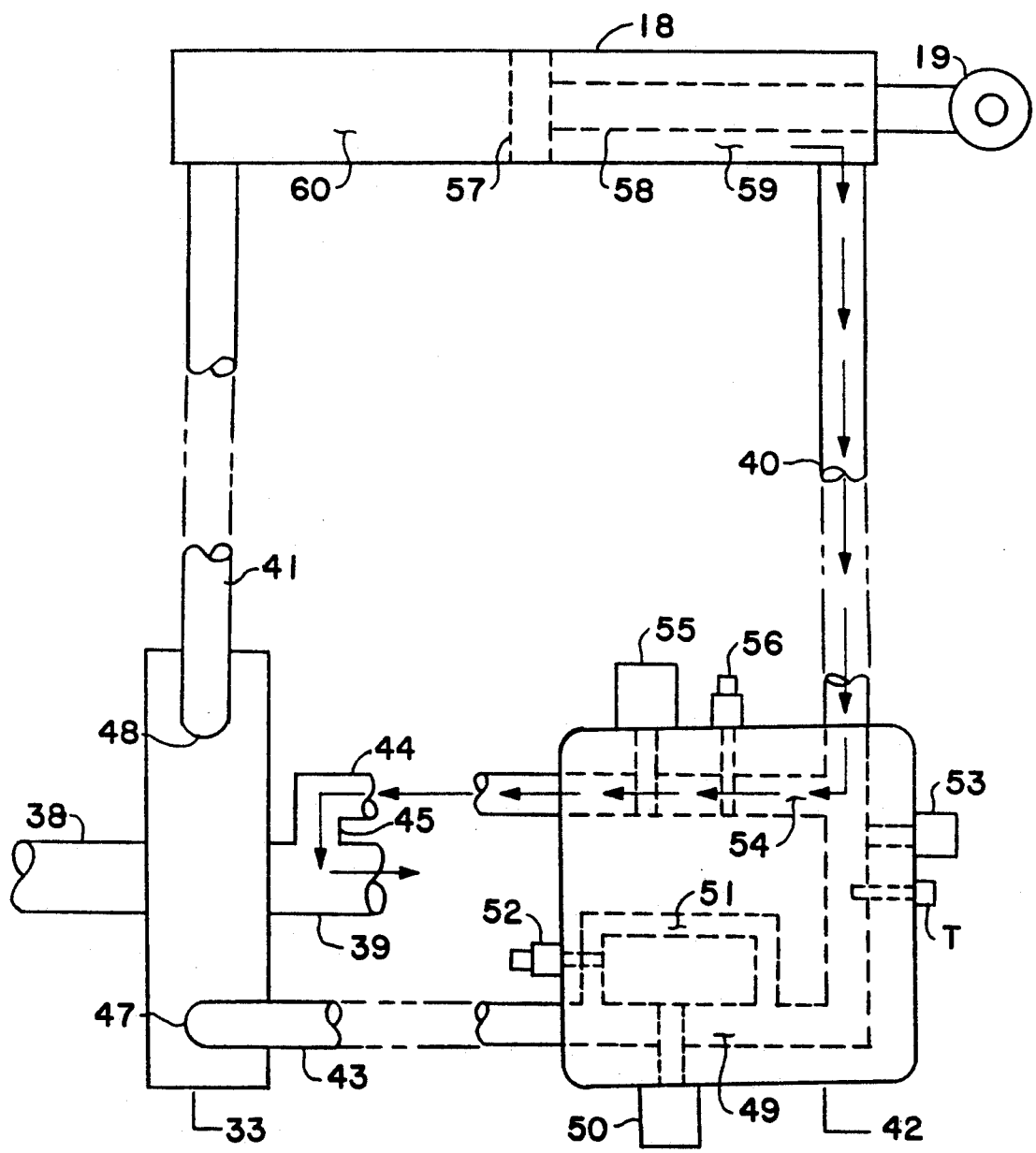

HYDRAULIC CONTROL SYSTEM FOR WEIGHING AND TWO-WAY VALVE THEREFOR

This is a division of application Ser. No. 07/868,305, filed Apr. 14, 1992, now U.S. Pat. No. 5,195,418, which is a division of application Ser. No. 07/683,078, filed Apr. 10, 1991, now U.S. Pat. No. 5,139,101, issued Aug. 18, 1992.

BACKGROUND OF THE INVENTION

The present invention is generally directed toward controlling the ascent and descent of lifting arms of a hydraulically operated lifting device. The invention is more particularly directed toward controlling lifting devices of the type used for refuse collection vehicles. The invention is yet more specifically directed toward briefly controlling the ascent and descent of the lifting arms for dynamic accurate weighing of.

The invention is particularly directed toward a two-way valve for use in bypassing the main operation lifting circuit and main operating valve in order to control the lifting arms wherein a sensor generates an analog signal received at an analog/digital converter and a microprocessor that calculates the weight.

My presently copending application Ser. Nos., 07/488,679, now U.S. Pat. No. 5,065,828; 07/614,871, now U.S. Pat. No. 5,038,876; 07/614,870, now U.S. Pat. No. 5,064,008; and, 07/614,869, now U.S. Pat. No. 5,065,829 disclose a hydraulic control systems useful for refuse vehicles that provide for static and dynamic weighing utilizing a bypass circuit that bypasses the lift circuit of the main hydraulic system. The bypass circuit allows for a controlled motion through a defined path determined by proximity switch means. To make the weight calculations the lift arms are, however, have to move controllably downward from one reference position to another for both gross and new weighing. While the systems disclosed in my previous applications are effective, they are in part limited by requiring both the gross and tare weights to be calculated only when the lifting assembly descends through a certain range. The information in these applications is incorporated herein by reference.

The present invention improves upon my previous inventions in these noted pending applications by providing a unique two-way valve arrangement that is cooperative with the main operating valve and the lift circuit of the lifting arms of a hydraulic lifting apparatus, such as a refuse vehicle. The two-way valve has two separate bypass flow paths through whereby the gross weight may be calculated dynamically while lifted and the tare weight calculated dynamically while the container descends. A microprocessor captures the full and empty weights at the same range of arm travel, up and down, due to the operation of proximity sensing means.

The present invention may utilize a hydraulic transducer as a weight sensor located in a flow chamber of the two-way valve, or alternately a tensiometer may be mounted on the lift arms. These weight sensors send analog signals in proportion to the pressure or strain, respectively exerted thereon to a programmed microprocessor for calculating the gross and tear weights during the time that the lifts arms are in a pre-determined location relative to a proximity switch. The use of a tensiometer, strain gauge or load cell avoids the calibration problems often caused by the fluctuating hydraulic fluid temperature levels in high pressure lines, when a hydraulic pressure transducer is used temperature probes are helpful to send a temperature signal to the microprocessor, which program will take the temperature level into account in the calculation.

Accordingly, it is a primary goal of the invention to provide for a control system for hydraulic lifting devices that operates in conjunction preferably with a tensiometer attached to the arms, and also with a hydraulic transducers fluidly communicating with the lift circuit of the hydraulic system, for dynamically weighing full and empty lifted containers, respectively.

An important goal of the invention is to make the weight calculation of the full load while it is lifted and the empty container as it is lowered.

It is a very important goal of the invention to provide for a bypass system which taps off from the lift circuit of the lift arms to direct fluid to a unique two-way valve for controlling the ascent and descent of the lift assembly, whereby accurate weighing takes place during the controlled phase.

It is an allied goal of the invention to provide a bypass circuit in cooperation with a two-way valve that is useful for operation with either a hydraulic transducer weight sensor cooperative directly with the valve, or a tensiometer/strain gauge weight sensor located on the lifting arms; sending analog weight/proportional signals in both cases based upon the activation of a proximity switch whereby weighing takes place at substantially the same position for every load in order to insure accuracy.

SUMMARY OF THE INVENTION

The invention may be summarized as comprising a bypass flow path bypassing the lift circuit of a hydraulic system that overrides, or momentarily acts in place of, the main operating valve whereby flow to or from the hydraulic lifting circuit may be controlled at a rate less than during normal operation by the main operating valve. A two-way valve is provided having a normally open valve in one chamber and a normally closed valve in another. The normally open valve being closable to re-direct flow from the main valve under pressure from a hydraulic pump to a bypass chamber having a flow control valve. The normally closed valve is capable of being open for directing flow from the lift circuit a second flow control valve for passing the hydraulic fluid back to a hydraulic fluid reservoir tank when the lift arms are descending. The operation of closing the normally open valve and opening the normally closed valve, respectively, makes different flow paths for the hydraulic fluid than during normal operation of the main operating valve, whereby the flow is directed through either of the flow control valves, so that the ascent and descent of the lifting arms of the system are substantially slower and more controlled. During the control phase, accurate readings may be made based upon analog signalling from a hydraulic transducer cooperative with the two-way valve or from a tensiometer mounted on the lift arms of the lifting assembly. Both the hydraulic transducer mode and the tensiometer mode yield continuous analog signals during operation of the hydraulic system but which readings are only calculated at the microprocessor during the controlled movement of the lift arms of the hydraulic system caused by activating a proximity switch which signals the operator to activate the two-way valve and thus initiating the weight calculation at the microprocessor.

The invention further includes a method for weighing in a hydraulically operated lift apparatus. The method includes operating a main valve to lift a load to a certain location whereby the operator will activate a momentary switch that closes a normally open valve in a bypass circuit thereby directing the flow through a flow control valve and bypass route in a slow controlled manner. The system also includes activating a signal-generating weight sensing means, i.e. a hydraulic transducer or a tensiometer, which output analog signal is received by a microprocessor and is calibrated proportionate to the weight. After the weight has been captured by the microprocessor, the normally open valve is re-opened and the hydraulic fluid flow is redirected back to the lifting circuit to complete the lifting of the load as needed.

The method further includes sending analog signals from a hydraulic transducer arranged in the lift circuit which analog signals are sent to the microprocessor pre-calibrated to calculate loads based upon pressures and wherein the analog signals are calculated only at a point determined by the movement of the lift arms of the lifting apparatus to activate a proximity switch. Alternately, the method otherwise includes sending analog signals from a tensiometer, load cell or strain gauge mounted on the lift arms which also generate calibrated analog signals in proportion to the strain experienced.

The method further includes the activation of the normally open valve of the two-way valve by the operator until the weight has been captured by the microprocessor whereupon the operator releases a momentary switch to deactivate the normally open valve and return control to the main valve.

Upon dumping the load, the method further includes the step of lowering the load to a position slightly above the proximity switch whereupon the operator activates another momentary switch to open the normally closed valve in the two-way valve to controllably direct fluid flow from the piston back to the hydraulic fluid reservoir. As the arms move to activate the proximity switch the microprocessor captures the weight and makes the calculation. When the calculation is made, the microprocessor will emit a signal to the operator to alert the operator to release the momentary switch which closes the normally closed valve. The remainder of the descent of the lift arms is made by the operator activating the main valve to lower the arms in the normal way.

BRIEF DESCRIPTION OF THE DRAWINGS

FIG. 10 illustrates the direction of hydraulic fluid for weighing the gross load while raising the arms and the bypass flow of the hydraulic fluid; and, FIG. 11 illustrates the direction of hydraulic fluid through the hydraulic system as shown in FIG. 7 for obtaining the tare weight of the container while lowering the arms in a controlled manner whereby the hydraulic flow returning from the lift circuit is bypassed in a controlled manner.

DETAILED DESCRIPTION OF THE INVENTION

Figure 1:
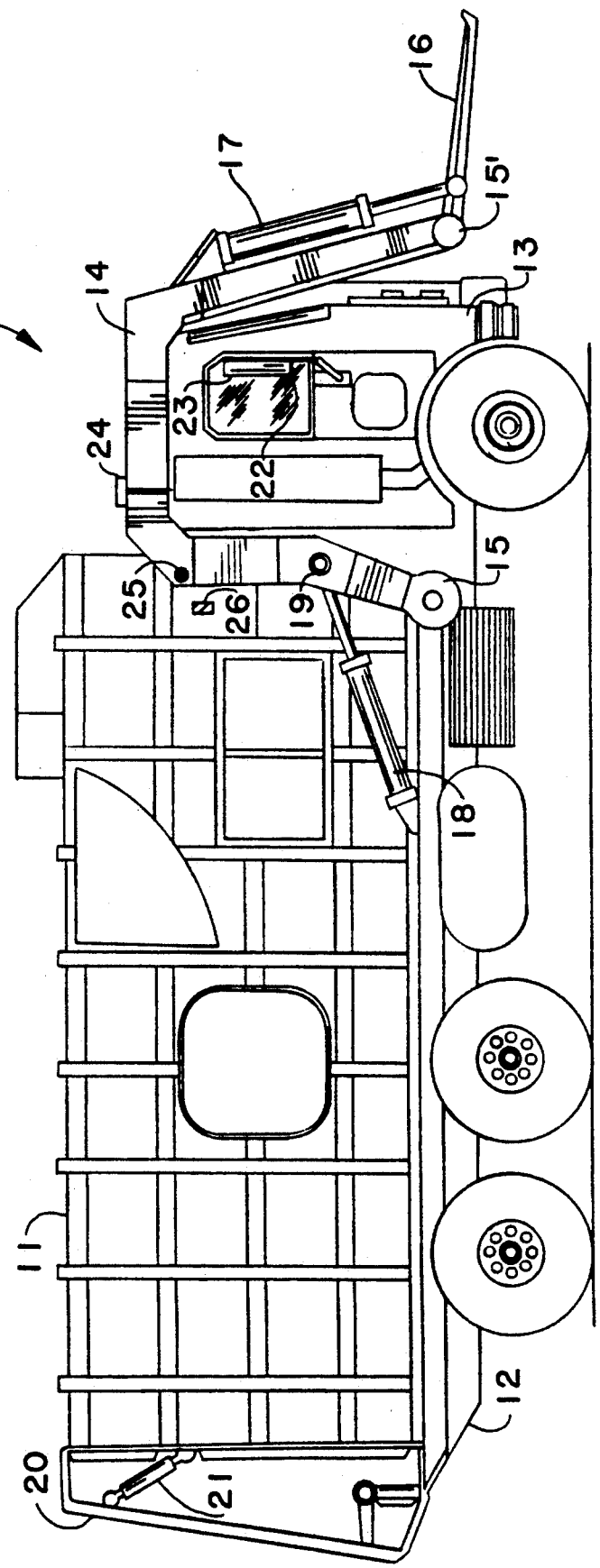
FIG. 1 is an elevational view of a refuse vehicle having a hydraulically operated lift arm assembly, a tensiometer on one of the arms, and also a striker pin and proximity switch for signalling a predetermined location of the arms for weighing.

In FIGS. 1-11, like reference numerals throughout refer to the same elements.

The invention will be described in connection with a refuse vehicle 10, as shown in FIG. 1, however, it will be understood that it has application to a variety of hydraulically operated lifting devices where accurate weighing of the loads is required.

The refuse collection vehicle 10 is a well known type used for collecting refuse and waste by lifting loaded containers and dumping them into a collection bin or hopper 11 mounted on the vehicle frame 12. The operator occupies a cab 13 for operation of the vehicle. A pair of lifting arms 14 pivotally are mounted to the frame 12 at 15 on either side of the frame 12 and have a generally downward U-shape as similarly described in my above-referenced co-pending applications U.S. Ser. Nos. 07/488,679; 07/614,871; 07/614,870; and, 07/614,869. FIG. 1 is a right side view of the refuse vehicle 10 and the arms 14 and 15 shown have substantially mirror images on the left side of the vehicle as would be clear. The arms 14 function to engaged refuse containers at forks 16 that are pivotally joined to the arms 14 at 15 and are operable by a hydraulic cylinder assembly 17 to be movable relative to the arms 14 for adjustment and leveling of an engaged container, or the like. The arms 14 are pivotable about 15 by means of a main hydraulic cylinder 18 that is supported at the frame 12 at one end and drivingly attached to the arms 14 at either side of the vehicle 10 at connections 19. The hydraulic cylinder 18 pulls the arms 14 to pivot at 15. In the disclosed embodiment the hydraulic cylinder 18 pulls against the arms 14 to pivot them to lift a load but the invention is equally functional in systems where a hydraulic cylinder pushes during the lifting phase. At the rear of the vehicle 10, a closure gate 20 is provided and is operated by means of a hydraulic cylinder 21. Within the bin 11, a hydraulically operated compaction device may be provided for compacting the load, for example, a packer blade device that is known in the industry. Additionally, the bin or hopper 11 may be pivotal to dump the load by the provision of another standard hydraulic cylinder means not shown.

Inside the cab 13 are found the control valves for the various hydraulic cylinders generally at 22 and an onboard microprocessor and analog/digital converter generally at 23 and within easy view of the operator for monitoring and operating the main hydraulic system and the controlled bypass weighing system of the invention, as will be explained with reference to the other figures.

In one form of the invention, the means for sending analog signals proportionate to the weight carried by the arms 14 is provided by a tensiometer 24 mounted on the arms 14 as shown in FIG. 1. In another form of the invention, a hydraulic transducer would be located to fluidly communicate with the bypass system for sending analog signals proportionate to the pressure sensed in the lift circuit. The invention being usable in either option or equivalents thereof.

Further shown in FIG. 1 is an activator striker pin 25 which activates a proximity switch 26 sensing the activator striker pin 25 as it comes into close proximity for purposes of generating a signal to the operator in the cab 13. The proximity switch will be activated initially upon raising of the arms 14 when a load is lifted and then, following the emptying of the load into the bin 11, the switch is activated once again as the activator striker pin 25 moves back into proximity with the proximity switch 26 on the return path downward.

Figure 2:
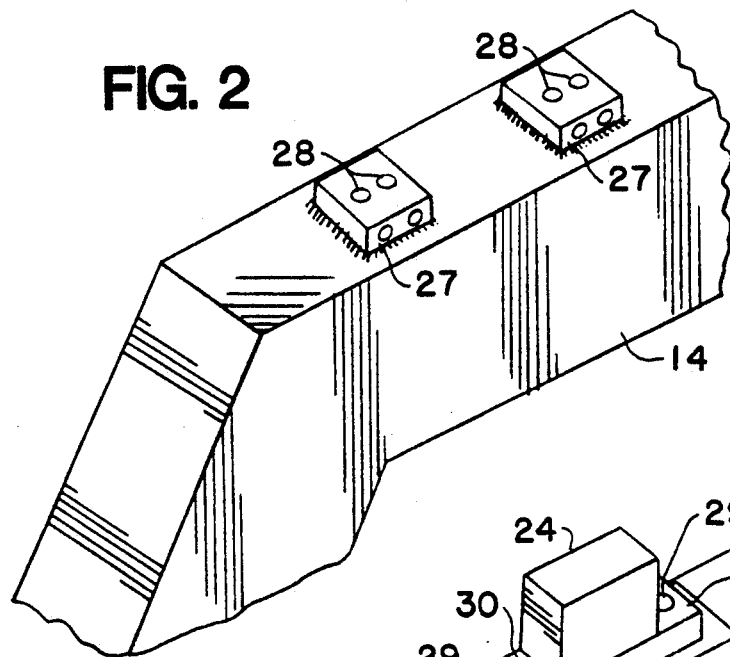
FIG. 2 is a broken-away portion of one of the lift arms of the refuse vehicle showing mounting pads for attachment of the tensiometer.
Figure 3:
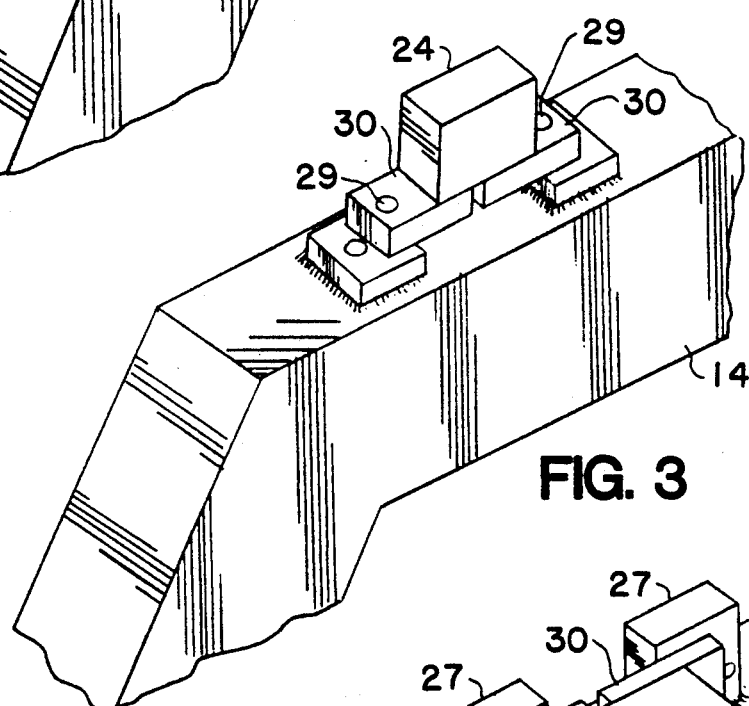
FIG. 3 shows the mounting of the tensiometer at the mounting pads as shown in FIG. 2.
Figure 4:
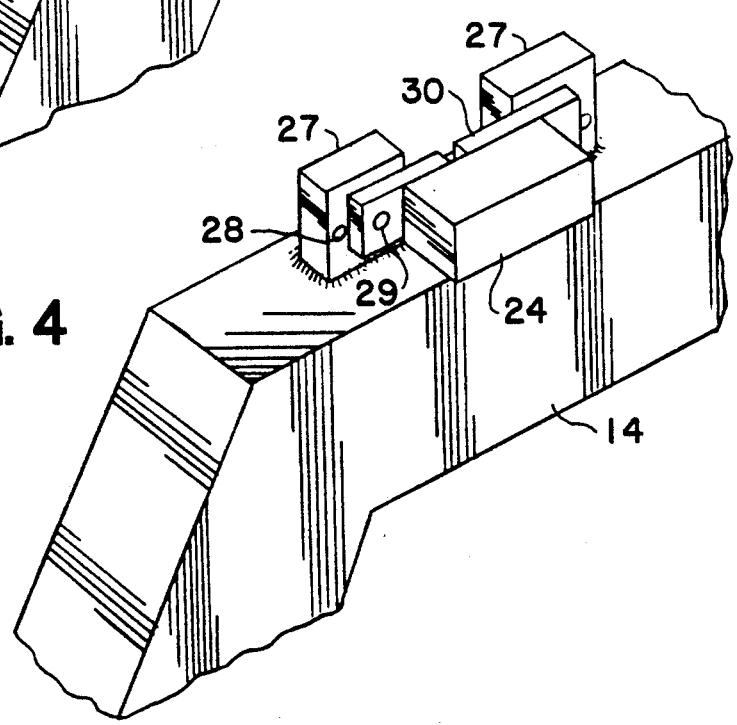
FIG. 4 shows an optional arrangement of the mounting pads and the tensiometer wherein the pads are in an upright position and the tensiometer is bolted to the sides of the mounting pads.

Turning now to FIGS. 2-4, the more specific details of the mounting of the tensiometer 24 are shown. In FIG. 2, a broken away portion of arm 14 is illustrated having welded thereon a pair of mounting pads 27. The mounting pads 27 having threaded bores 28. With reference now to FIG. 3, it will be seen that the threaded bores 28 are provided to receive a tension cap screw 29 at each bore 28 which passes through flanges 30 of the tensiometer 24. Each mounting pad 27 being provided in the disclosed embodiment with pairs of threaded bores 28 whereby to be capable of mounting tensiometers with different connection spacings at their flanges 30. When a container or the like is engaged by the forks 16, tension and strain are created on the arm 14 between the mounting pads 28 as would be understood. In the disclosed embodiment, the tensiometer is provided to send calibrated analog millivolt signals in proportion to the tension and strain between the mounting pads 28 as they are pulled away from each by loading tension on the arm 14. Equivalently suited strain gauges or load cell devices also may be used, as would be clear to someone skilled in the art.

With regard to FIG. 4, an alternate mounting arrangement for the tensiometer 24 is provided wherein the mounting pads 27 are welded vertically, or edgewise, to the arm 14 and the tensiometer 24 is attached to the mounting pads 28 in a horizontal arrangement having the tension cap screws 29 to be horizontally thread engaged with the threaded bores 28. The invention is thereby useful with a wide variety of lifting devices having different size lift arms, and with a variety of tensiometers and equivalent strain gauge and load cells sensing devices, by allowing a variety of mounting arrangements.

In the disclosed embodiment, the microprocessor 23 is calibrated to the particular location of the tensiometer 24 on the arms 14 so that the weight calculation is accurate for each weight captured. In this regard, the weighing signal to the microprocessor from the tensiometer 24 is intended to be used in the programmed weight calculation at substantially the same reference position or the arms for every load weighed.

The successful use of the tensiometer 24 is obtained in cooperation with a two-way control valve and bypass system as will be explained next with reference to FIGS. 5-11. It is the major intent of the invention to obtain stable dynamic readings on the way up and on the way down by use of the tensiometer 24 or alternately by use of a hydraulic transducer in fluid communication with the lift circuit line of hydraulic cylinder 18.

Figure 5:
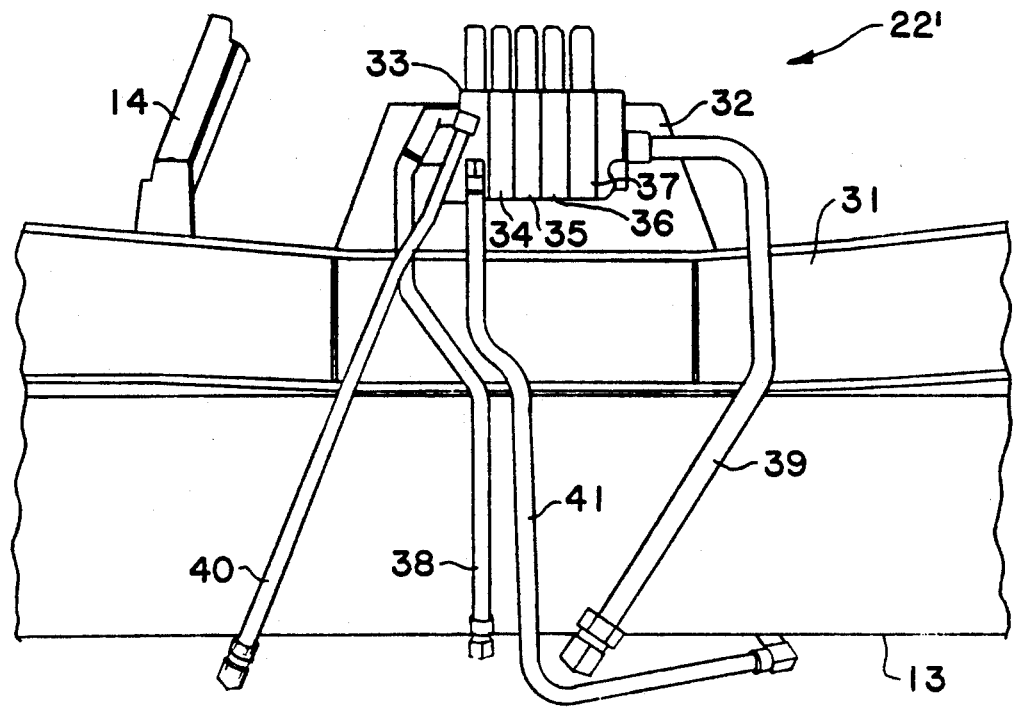
FIG. 5 is an elevational view of a conventional operating valve bank showing a pressurized hydraulic feed line, a return line to a hydraulic fluid reservoir, lift and lower lines and lever operable main valve for the lift arm assembly as shown in FIG. 1, and a plurality of other typical lever-action valves for a refuse vehicle for operating a packer blade, the front forks of the lifting apparatus, and a tailgate, and also a valve for dumping the vehicle body.
Figure 6:
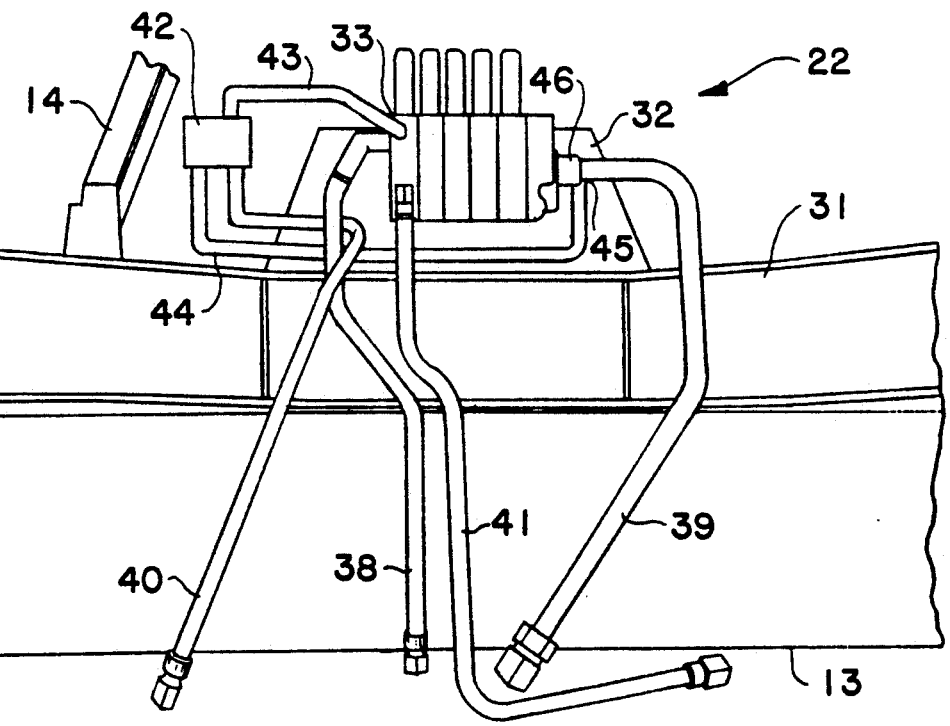
FIG. 6 illustrates the combination of the hydraulic control system of the invention in cooperation with the valve bank as shown in FIG. 5 and the rearrangement of the hydraulic lines to be cooperative therewith, including a bypass circuit and two-way valve.

Turning to FIG. 5, a detailed view of a conventional valve bank assembly 22' showing the conventional arrangement in the cab 13 and FIG. 6 shows the modified assembly 22 of the invention. Valve assembly 22' would be mountable within the cab 13 generally at a dashboard or panel 31 and support assembly 32. At the left side of FIG. 5, one of the lift arms 14 is shown for illustrative purposes. In a usual way, the main valve bank assembly 22' provides a lever operable main valve 33 for raising and lowering the lift arms 14 by means of controlling the action of hydraulic cylinder 18. Next, is another lever operable valve 34 for activating a packer blade within the bin 11 of the vehicle 10. Thirdly, a lever operable valve 35 is provided for operation of the fork 16 by activating the hydraulic cylinder 17 therefor. Fourth, a lever operable valve 36 is provided for the operation of the tailgate 20 by the hydraulic cylinder 21. The fifth illustrated valve is a lever operable valve 37 for activating a hydraulic cylinder in connection with tipping the hopper 11 to dump the contents, for example, at a landfill. The valve bank assembly 22' receives hydraulic fluid through line 38 that is under pressure from a pump taking fluid from a reservoir in a known manner (not shown). A return line to the reservoir is shown at 39.

The present invention is cooperative with the operation of the main valve 33 for controlling the raising and lowering of the lift arms 14. The valve 33 directs fluid under pressure through a lift circuit line 40 to one side of a piston within the hydraulic cylinder 18 to pivot the lift arms 14 upwardly. The valve 33 also communicates with a lowering circuit line 41 for alternately introducing fluid under pressure to the opposite side of the piston of the hydraulic cylinder 18 to lower the arms 14. The lever operable valve 33 has a standard design and provides for moving a lever from a neutral position to a lift position to direct fluid under pressure through one port while receiving fluid through another port for return to the reservoir. When moved into the other or lower position, the fluid flows at the ports reverse and the fluid moves in the opposite direction through each port to introduce fluid under pressure to an opposite side of a cylinder piston and force fluid on the other piston side to return to the reservoir. For aid in understanding, with respect to FIG. 6, the fluid flow would be downwardly in the lift line 40 and upwardly in lowering line 41 when raising the arms 14; oppositely, the flow would be upwardly through the lift line 40 and through the lowering line 41 when the arms 14 are lowered. The operation will be further understood in connection with the discussion of the directional flow diagrams of FIGS. 8 and 9.

The modification to the conventional valve assembly 22 is shown in FIG. 6 at valve assembly 22. A novel two-way valve 42 is added to the hydraulic system to be cooperative with the valve 33 but does not affect operation of valves 34–37. The lift line 40 for feeding fluid under pressure to the hydraulic cylinder 18 is re-routed from the valve 33 to connect instead to the two-way valve 42 as shown. A connector line 43 is added to tap-off from a port of the main operating valve 33 to connect to the two-way valve 42. A bypass or tap-off line 44 joins the two-way valve 42 to the reservoir return line 39 at a juncture 45 located at the reservoir-return side of an outlet 46 of the valve bank assembly 22. The return line 39 remains otherwise in the same connective arrangement as in valve bank assembly 22'. The pressurized feed line 38 remains in the same position as in assembly 22'. Also, the lowering circuit line 41 for moving the hydraulic cylinder 18 in the lowering direction remains connected to valve 33 as in the valve bank assembly 22'.

The schematic views shown in FIGS. 7–11 illustrates the flow of the hydraulic fluid through the valve 33, the two-way valve 42, the hydraulic cylinder 18, and the lines 38, 39, 40 and 41.

Figure 7:
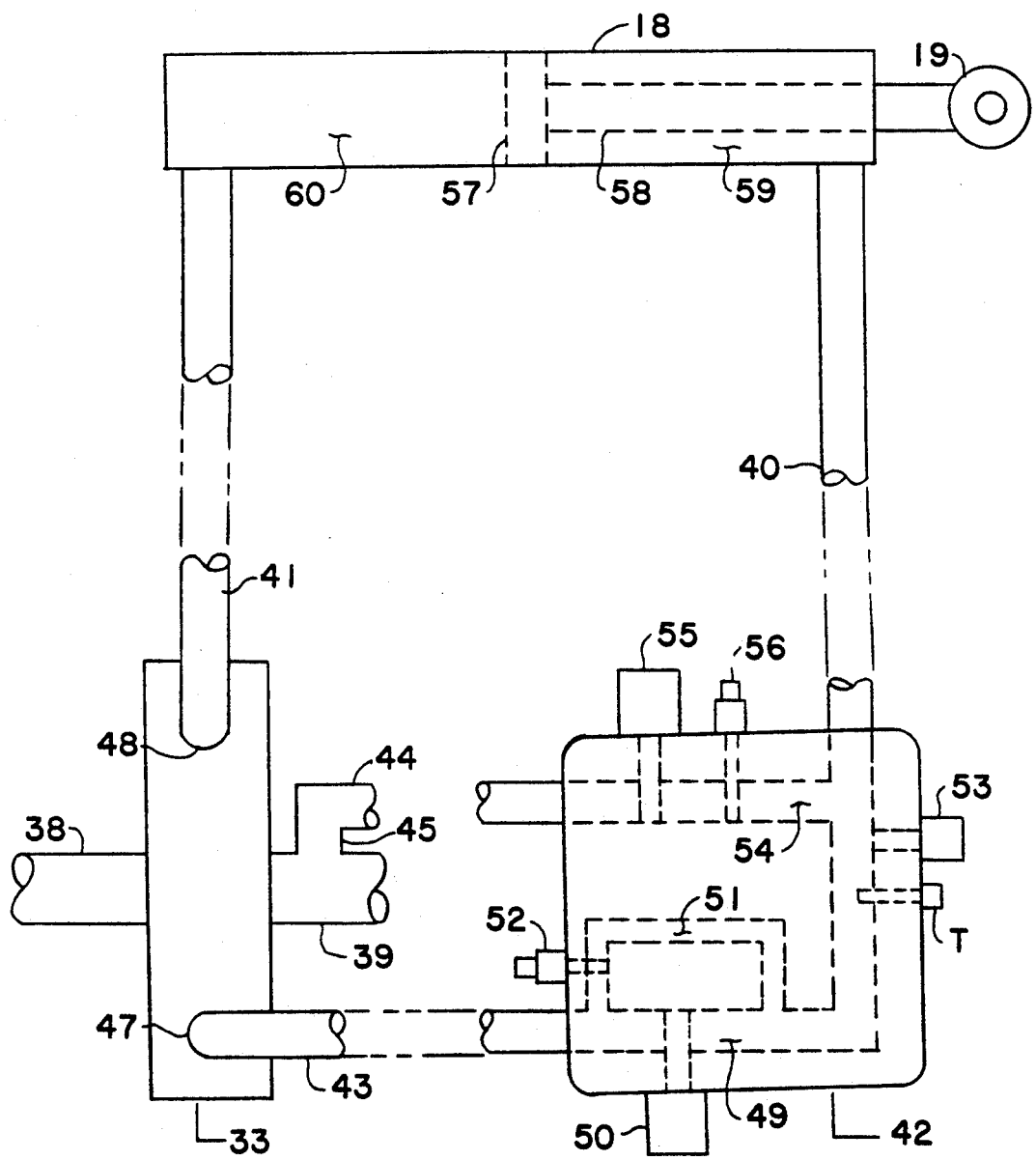
FIG. 7 is a diagrammatic illustration of a lift and lower circuit for the lifting apparatus of the device operated by a main valve and showing a two-way valve and a bypass system for the controlled weighing system of the invention.
Figure 8:
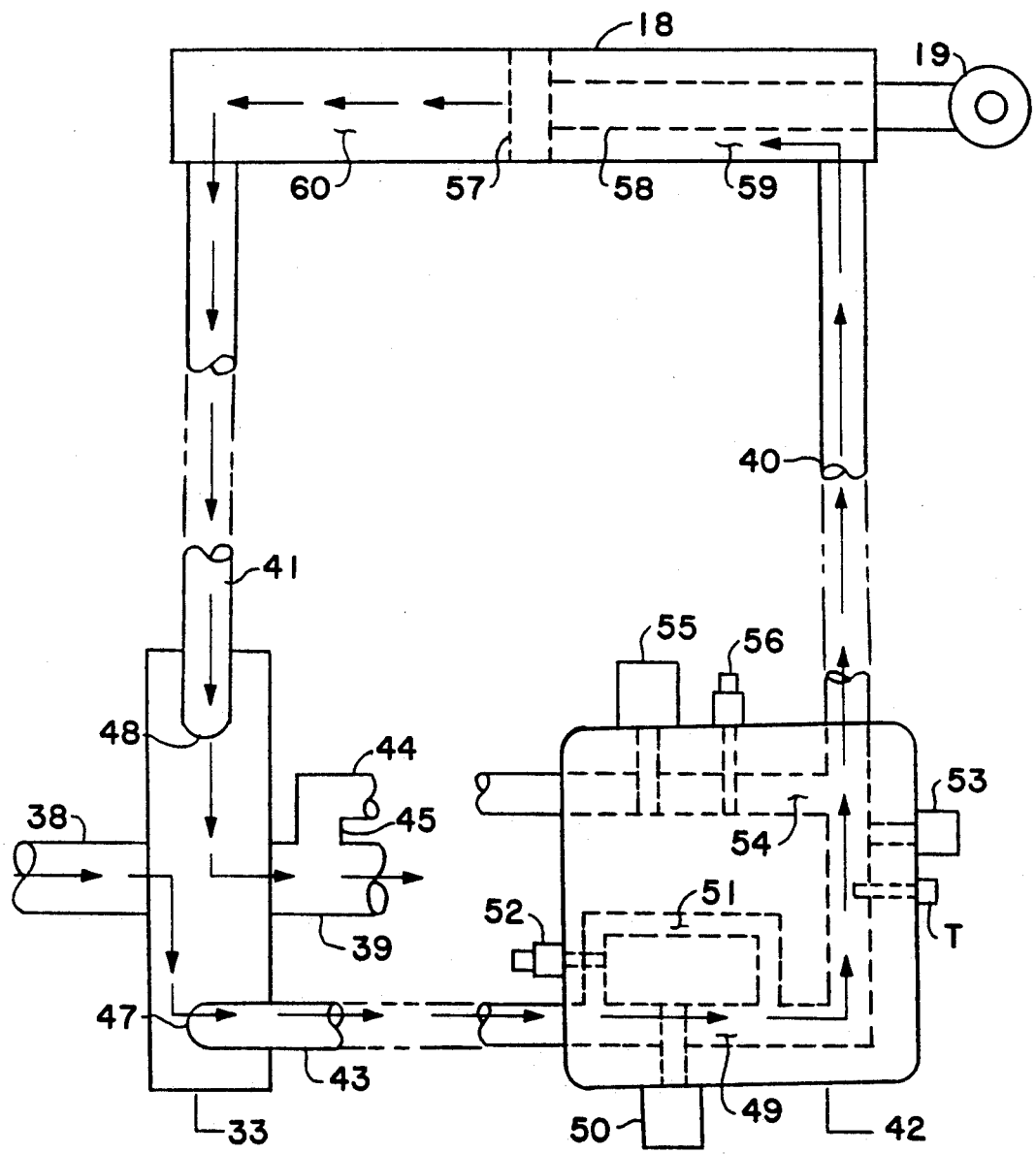
FIG. 8 shows the direction of hydraulic fluid flowing through hydraulic system of FIG. 7 during the normal operation of a main valve to raise the lift arms.
Figure 9:
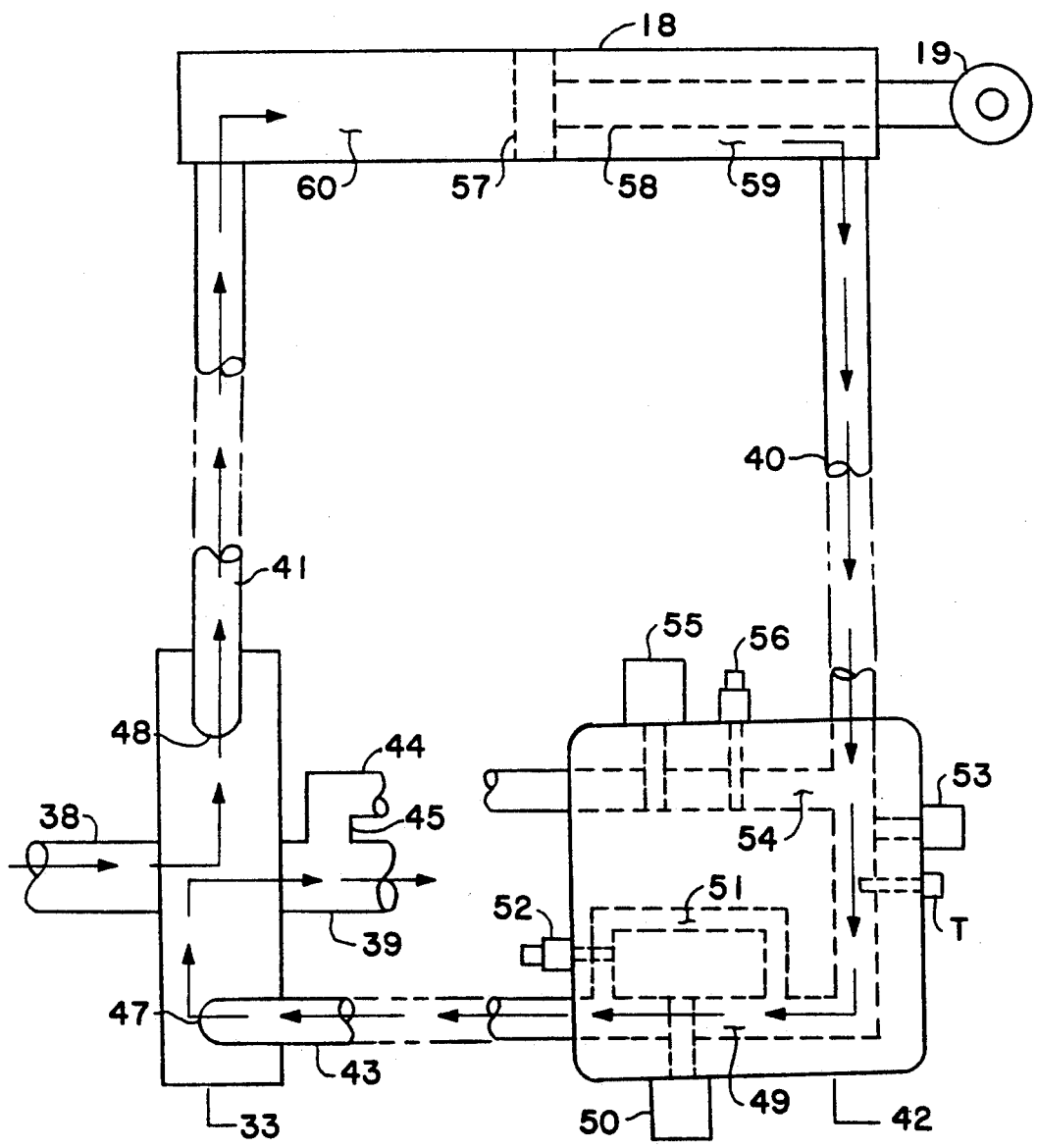
FIG. 9 illustrates the direction of hydraulic fluid during normal operation of the main valve to lower the arms for the hydraulic system as shown in FIG. 7.

FIG. 7 is a schematic illustration of the connection of the new novel two-way valve 42 to the hydraulic system of the vehicle 10, wherein the modified valve bank assembly 22 is shown at rest, i.e. no hydraulic fluid flow. FIGS. 8 and 9 illustrate, respectively, the normal, non-bypass operation of the valve bank assembly 22 for raising and lowering the lift arms 14. FIG. 10 illustrates the hydraulic fluid flow during the lifting of lift arms 14 as controlled by the two-way valve 42 for dynamic weighing of the gross weight. FIG. 11 illustrates the hydraulic fluid flow as controlled by the two-way valve 42 during the lowering of the arms for dynamic weighing the empty weight of the refuse container.

More specifically with respect to FIGS. 6 and 7, the two-way valve 42 is arranged for bypassing the hydraulic flow to and from the lift circuit line 40 to accomplish the controlled motion for dynamic weighing to be made. Line 43 taps off from the valve 33 at a port 47 at which the lift line, as shown in FIG. 5, was conventionally connected. At the other end of the valve 33, a port 48 communication with the lowering circuit line 41 as in the conventional valve assembly of FIG. 5. The lever action of the valve 33 is capable of directing inlet flow from pressure line 38 to flow either outwardly through 47 or 48, or through neither when kept in a neutral position in a known way.

The two-way valve 42 includes a main, or flow through, chamber 49 access to which is controlled by a normally open solenoid operated valve 50. A first bypass chamber 51 taps off of the chamber 49 to either side of the normally open valve 50 and when flow is received from line 43 via chamber 49, it is controlled by a flow control valve 52 in bypass chamber 51. The main chamber 49 fluidly communicates with a pressure transducer 53 and a temperature sensor 54. Generally between the transducer 53 and the connection of the two-way valve 42 to the lift line 40, the two-way valve 42 includes a second bypass chamber 54 tapping off from the main chamber 49, flow through which is obtained by operation of a normally closed solenoid operated valve 55 and controlled by a second flow control valve 56. The bypass chamber 54 communicates with the tap-off line 44 and thereby the return line 39.

At the top of FIG. 7, the hydraulic cylinder 18 is illustrated, showing in dashed lines, a hydraulically operated piston 57 drivable at the end of a piston rod 58. A lift chamber 59 is at the right side of the piston and a lowering chamber 60 is to the left of the piston 57, whereby fluid entering through line 40 under pressure will fill the chamber 59 to drive the piston to the left and thereby pivot the arms 14. Conversely, fluid entering the lowering chamber 60 under pressure from line 41 will move the piston 57 to the right for the lowering of the arms 14.

The normal operation for raising the arms 14 is illustrated in FIG. 8. When a load has been engaged at the forks 16 to be dumped into the bin 11, the operator moves the lever of the lever operable main valve 33 of the valve bank assembly 22 in a first direction which directs flow from input line 38 to flow outwardly through port 47. This action in turn opens port 48 to receive fluid from lowering line 41. The hydraulic fluid directed through port 47 is conveyed via the tap-off line 43 to the two-way valve 42. Because the valve 50 is normally open, fluid freely flows through the flow through chamber 49 and outwardly of the valve 42 into the lift circuit line 40, which directs the flow into the hydraulic cylinder 18 at chamber 59. Increased pressure in the chamber 59 drives the piston 57 in the leftward direction as noted. Hydraulic fluid in chamber 60 is urged outwardly through line 41 and to the port 48 of the valve 33. The fluid is received at the port 48 then directed outward of the valve 33 into the return line 39 and back to the reservoir. In this regard, the tap-off line 43 and flow through chamber 49 do not change the flow rate to lift line 40 in any substantial way.

Turning now to FIG. 9, the opposite of the function depicted in FIG. 8 is shown, namely, the lowering of the arms 14 by the normal operation of the main valve 33. To lower the arms 14, the lever of the main valve 33 is moved in an opposite direction whereby to direct flow from the pressure line 38 to flow outwardly at port 48 into the lowering circuit line 41 for introduction of the hydraulic fluid under pressure into the lowering chamber 60 to force the piston 57 in the opposite direction. As would be understood, the port 47 can now receive inward flow whereby fluid will be forced out of chamber 59 back through the lift circuit line 40, the flow chamber 49 of the valve 42, and return through the tap-off line 43 to the port 47. The returning fluid is directed through the valve 33 outwardly through to the return line 39 and back to the reservoir. The views in FIGS. 8 and 9 show reverse flow paths through the same conduits for moving the piston 57 leftward or rightward to raise or lower the arms 14. This is the normal operating mode of the valve assembly 22 which causes the arms to move quickly and creates large pressure and temperature fluctuations, vibration, shaking, and bouncing, which makes weighing quite difficult and extremely inaccurate.

As a result, the present invention provides the two-way valve 42 tapping-off along line 43 returning through line 44 whereby to circumvent and obviate the difficulties inherent in dynamic weighing and which further allows for the dynamic weighing to occur in one motion upward and a return motion downward. The weighing is achieved without requiring a repetitive lowering through a certain range for both gross and tare weight calculations.

Attention is directed to FIG. 10 which schematically illustrates the flow of hydraulic fluid to the hydraulic cylinder 18 for purposes of controlling and stabilizing the hydraulic fluid pressure to take accurate weight measurements. First a refuse container is seized by maneuvering the forks 16 into supportive engagement therewith. Next, the operating valve 33 is open so that pressurized flow passes from port 47 through line 43, main chamber 49 and lift line 40. As the activator striker pin 25 approaches the proximity switch 26, the operator activates a momentary switch causing normally open solenoid valve 50 to close. The valve 50 closes thereby blocking flow through the flow chamber 49 and redirects the hydraulic flow through the flow control valve 52 in the first bypass chamber 51 at a much reduced rate. The stable flows moves through the bypass chamber 51 and back into the flow chamber 49 downstream of the closed valve 50. The fluid flows past the pressure transducer 53 and temperature probe T. Both of the analog signals generated by the transducer 53 and temperature probe T are monitored by an onboard microprocessor having an analog/digital converter for eventually computing the weight. The arms 14 pivot backward and the activator striker pin 27 activates the proximity switch 26, which serves as a reference point and the microprocessor then makes the gross weight calculation during receipt of the analog signals at that moment from the transducer 53 and probe T for a preset duration of software program. When the weight is captured, the microprocessor will cause to issue an audible, or visual signal, or the like, to the operator indicating that the calculation has been made. The operator releases the momentary switch to deactivate the valve 50 to return it to its normally open position and allowing the normal flow of hydraulic fluid from line 43 through main chamber 49 and into the lift line 40, as in FIG. 8. Accordingly during the operation of the normally open valve 50, a controlled rate of flow is introduced into the lift chamber 59 to evenly and smoothly move the piston 57 and therefore provide stable conditions at the pressure transducer 53 and temperature probe T to make an accurate weighing.

Upon dumping the container into the hopper 11, the operator reverses the main operating valve 33 cause the flow from pressurized line 38 to be directed outwardly through port 48 thereby pressurizing line 41 and lowering chamber 60, as in FIG. 9. This causes the piston 57 to move in the rightward direction for lowering the arms 14. The port 47 then receives fluid flowing from lower circuit line 40 through the flow chamber 49 of the two-way valve 42 and the tap-off line 43. This return flow is directed by the valve 33 outwardly to the reservoir return line 39. As the activator striker pin 25 of the descending arms 14 approaches the proximity switch 26 which in the disclosed embodiment would be at a distance of about 4-6 inches, the operator shifts the lever of the main valve 33 to the neutral position thereby closing both ports 47 and 48. At this point the operator will have briefly stopped the load.

Attention is directed to FIG. 11, wherein the hydraulic fluid flow for calculating the tare weight is shown, with the main valve 33 in the neutral position the operator then activates a momentary switch to open the solenoid-operated normally closed valve 55. When valve 55 is open the hydraulic fluid from chamber 59 drains by force of gravity back through the lift circuit line 40 to the main chamber 54 of the two-way valve 42. Because the port 47 is closed at the valve 33 return flow outwardly from chamber 49 through tap-off line 43 is blocked and the only path is therefore through the second bypass chamber 54 by virtue of the opening of the normally closed valve 55. Flow through the second bypass chamber takes place in a controlled way created by the second flow control valve 56 permitting flow at a reduced stable rate compared to that of the normal flow using only the valve 33. The hydraulic fluid flows back to the return line 44 to enter the reservoir return line 39 at the downstream side of the valve bank assembly 22 shown at 46 in FIG. 6. The smooth controlled gravity descent of the arms 14 cause stable fluid pressure chamber 49 at the transducer 53 and temperature probe T. The arms 14 move downward until the activator striker rod 25 activates the proximity switch 26. A signal then generated from the proximity switch 26 acts as a reference point whereby the microprocessor momentarily captures the net weight as the arms moving in this reference position, which may be a period of about ½ second after activating the switch 26. Upon capturing and making the net weight calculation, a visual or audio signal, or the like, is generated by the microprocessor indicating to the operator that the calculation of the tare weight has been made. The alerting signal and means therefor would be determined by the microprocessor program and system. Then the operator releases the momentary switch and the normally closed solenoid-operated valve 50 closes again. The operator then moves the lever of the valve 33 to the lowering position as in FIG. 9, so that the fluid flows under pressure outward through port 48 into chamber 60, which urges the piston 57 in a more forceful manner in the opposite direction to lower the arms 14. This action forces fluid in the lift chamber 59 back through the lift circuit line 40, main chamber 49, and tap-off line 43 to port 47 and then outwardly of the valve 33 to the reservoir return line 39. The forks 16 are ultimately returned back to the lowered position shown in FIG. 1 for disengagement with the non-empty refuse container, or the like.

The onboard microprocessor may be provided with a program for calculating the total weight dumped into the hopper 11 during the workday and also for individually calculating loads collected from each particular customer. The software program of the microprocessor will take into account the calibration of the temperature probe T in combination with the simultaneous analog pressure signal of the transducer 53.

The invention further provides the alternate embodiment for a weight sensor wherein the tensiometer 24 would generate the analog signal received by the microprocessor during the momentary period after activating the proximity switch at the reference position during lifting and lowering.

Accordingly, the calculations made by the microprocessor and for either the transducer 53 or the tensiometer 24, occur during a controlled phase of the lifting and lowering of the arms caused by operation of the two-way valve 42 and the two bypass chambers 51 and 54, respectively.

It will also be apparent that the flow control valves 52 and 56 may provide for different flow rates. Thus individual calibrations for raising and lowering rates can be made and greater accuracy obtained.

It will be understood that the proximity switch 26 would be a common reference point for calibration of the weight so that the weight captured for empty and full containers would be made at the same location to provide for accurate calibration. Signals received before or after the reference position are ignored by the microprocessor in making the weight calculation.

The foregoing description of the exemplary embodiment shown in FIGS. 1-11 is provided for purposes of explaining the invention, but is not intended to limit the scope and broad range of equivalents of the claims appended hereto.

What is claimed is:

1. A two-way valve connected in a hydraulic lifting apparatus between a main operating valve for a hydraulic cylinder and the lift line to the hydraulic cylinder, said two-way valve being connected to a return line of the lift apparatus separate from said main operating valve, said two-way valve comprising a flow-through chamber with a normally open valve therein for permitting hydraulic fluid flow therethrough from said main operating valve; a bypass chamber means communicating with said flow through chamber to either side of said normally open valve wherein upon closing said normally open valve fluid flow is directed through said bypass chamber means, and said bypass chamber means having flow control means therein for reducing the flow of hydraulic fluid from said main operating valve; a second bypass chamber fluidly communicates with said flow through chamber between said normally open valve and the lift line, the second bypass chamber having therein a normally closed valve and flow control means for controlling flow therethrough when lowering the lifting apparatus, and the second bypass chamber capable of directing flow therethrough outwardly of the two-way valve to the return line to lower lifting apparatus independently of the main operating valve.

* * * * *